Figure 1:
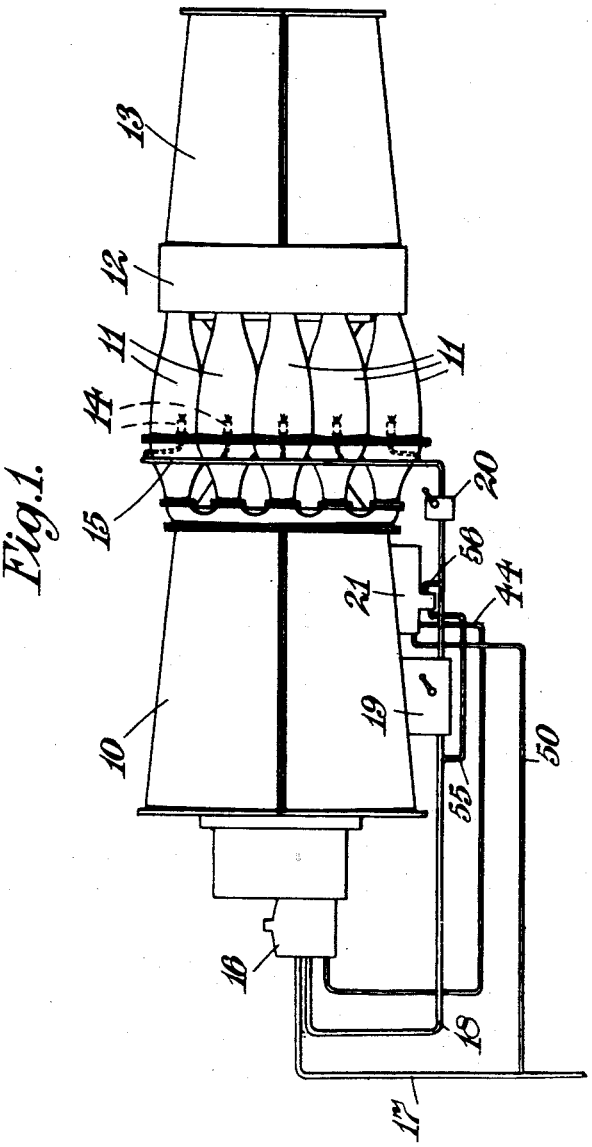

Aug. 5, 1952             A. JUBB            2,605,709
FUEL METERING MEANS FOR GAS TURBINE
ENGINE FUEL SYSTEMS

Filed May 1, 1950                            3 Sheets-Sheet 1

INVENTOR
ALBERT JUBB by Wilkinson Mawhinney
Attys.

Aug. 5, 1952

A. JUBB 2,605,709

FUEL METERING MEANS FOR GAS TURBINE
ENGINE FUEL SYSTEMS

Filed May 1, 1950

3 Sheets-Sheet 3

INVENTOR
ALBERT JUBB
by Wilkinson Mawhinney
Attys.

Patented Aug. 5, 1952

2,605,709

UNITED STATES PATENT OFFICE 2,605,709

FUEL METERING MEANS FOR GAS-TURBINE ENGINE FUEL SYSTEMS

Albert Jubb, Buttershaw, Bradford, England, assignor to Rolls-Royce Limited, Derby, England, a British company Application May 1, 1950, Serial No. 159,161
In Great Britain August 18, 1949

6 Claims. (Cl. 103—12)

This invention relates to fuel systems for gas-turbine engines, and is particularly concerned with systems of the kind (hereinafter referred to as fuel systems of the kind specified) in which a pressure-responsive device subjected to an atmospheric air pressure is operative to maintain a predetermined fuel pressure difference across an orifice-type fuel-low-metering device whereof the effective orifice area is selectively variable to vary the fuel flow therethrough arising from said pressure difference, and wherein said predetermined fuel pressure difference is controlled by the pressure responsive means to have a substantially directly proportional relationship with the atmospheric air pressure to which the pressure responsive means is subjected.

The term "atmospheric air pressure" used in this specification includes ambient atmospheric pressure (i. e. static pressure), or ambient atmospheric pressure as modified by flight of an aircraft, and/or as modified by the conditions prevailing in the air intake to the compressor of the gas-turbine engine. Thus, for example, a connection to the pressure responsive device may be made to a static pressure point on the aircraft, to a static or total head point in the air intake of the compressor or to a total head point on the aircraft.

One known form of fuel system of the kind specified, as used in connection with gas-turbine engines, includes a pump of variable capacity type, the capacity being controlled by a servo mechanism including a piston and cylinder device which is subjected to a servo fluid pressure derived from a suitable fluid pressure source and which device is itself controlled by a servo-fluid outflow metering valve which determines the outflow of servo-fluid from one side of the piston. The outflow metering valve is actuated by means of an operating lever which is subjected to three principal loads. The first load is applied to the lever by an evacuated capsule subjected externally to atmospheric air pressure such that the load increases with decrease of this pressure in a manner substantially proportional to the value of the pressure; the second load is applied to the lever in the same sense as the first load through a pressure-sensitive device which is sensitive to the fuel pressure difference to be controlled; and the third load is applied to the lever by a spring in a sense opposite to that of the first and second loads. In this manner the sum of the moments due to the loads exerted by the evacuated capsule and by the controlled fuel pressure difference remains substantially constant and equal to that of the opposing moment due to the load exerted by the spring. Thus the value of the fuel pressure difference decreases substantially proportionally with the decrease of the atmospheric air pressure to which the evacuated capsule is subjected.

The present invention has for an object to provide in fuel systems of the kind specified an improved arrangement of orifice-type fuel-flow-metering device, which will give rise to certain desirable characteristics in the operation of the engine.

According to the present invention in a fuel system of the kind specified, the orifice-type fuel-flow-metering device comprises a first orifice means arranged so that its effective area is selectively variable and so that for any selected effective area the pressure drop across it is substantially proportional to the square of the fuel flow therethrough, and a second orifice means connected hydraulically in series with said first orifice means, said second orifice means being arranged so that the pressure drop across it is substantially proportional to the flow of fuel therethrough. With such an arrangement of the orifice-type fuel-flow-metering device said fuel pressure difference which is controlled by the pressure responsive means is the sum of the pressure drops across said first and second orifice means.

As will be explained in greater detail hereinafter, in hitherto known arrangements, the controlled fuel pressure difference is merely the pressure drop across a selectively variable orifice area, and as a result an undesirable fuel flow characteristic is obtained. The undesirable characteristic is normally that an excessive amount of fuel is supplied to the engine at high altitude for a given setting of the preselectively variable orifice area.

Adoption of the invention permits selection of a fuel flow/pressure drop characteristic for the orifice-type fuel-flow-metering device such that the fuel supply to the engine for a given setting of the first orifice means approximates more closely to the engine requirements.

According to a feature of the invention therefore, the first and second orifice means are given such fuel flow/pressure drop characteristics that, for a selected effective area of the first orifice means corresponding to a high or maximum power, the fuel flow through the orifice-type fuel-flow-metering device as determined by each predetermined value of the sum of the pressure drops is substantially equal to the engine fuel requirements at the corresponding atmospheric air pressure.

The orifice means having a characteristic such that the pressure drop is substantially proportional to fuel flow therethrough is hereafter referred to as a "linear flow valve," and may conveniently comprise a conical valve member suitably proportioned to define in conjunction with a valve port and with a spring loading on the valve member an effective orifice area giving the desired linear or proportional characteristic.

The present invention may be used in combination with that described in co-pending application Serial No. 159,162 in the name of D. O. Davies where a second linear flow valve is arranged hydraulically in parallel with the variable area orifice means, said second linear flow valve being preferably arranged to pass the whole of the fuel required under idling or low-power conditions of the engine.

Figure 2:
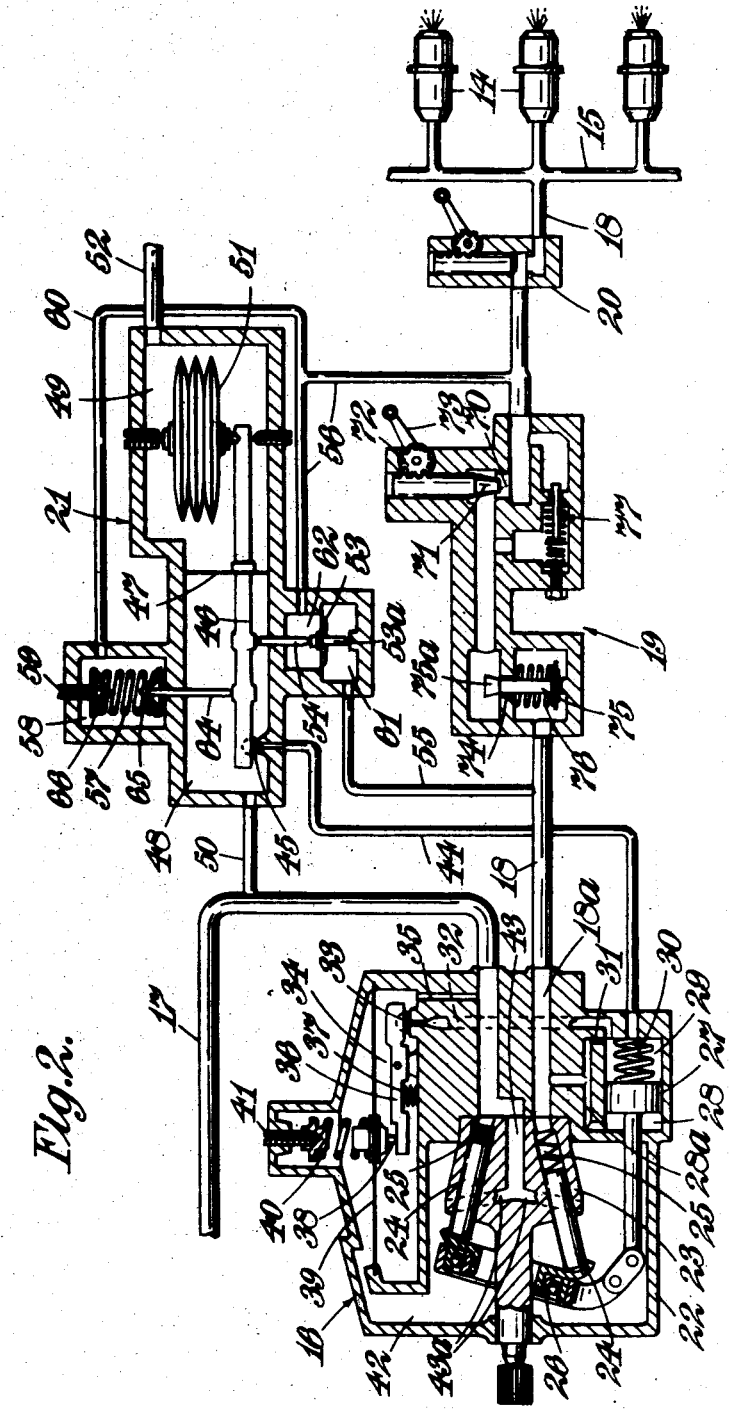
Figure 3:
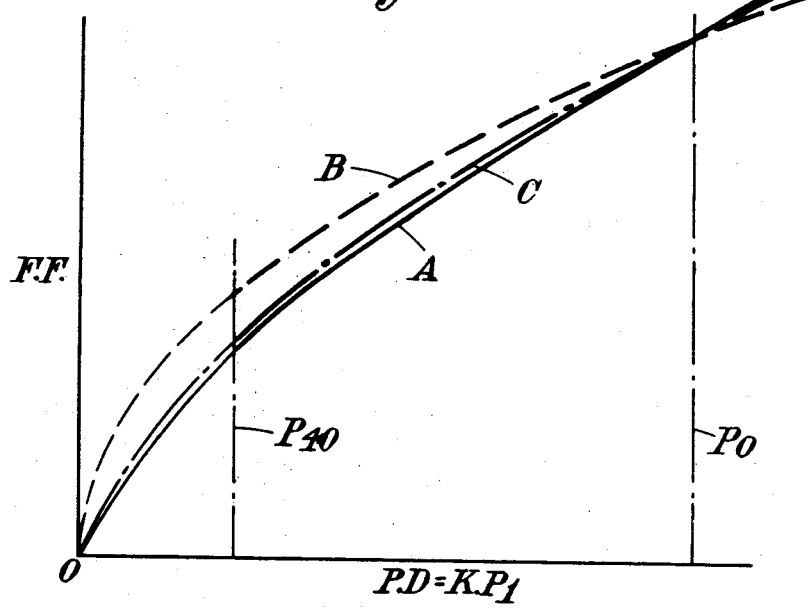
Figure 4:
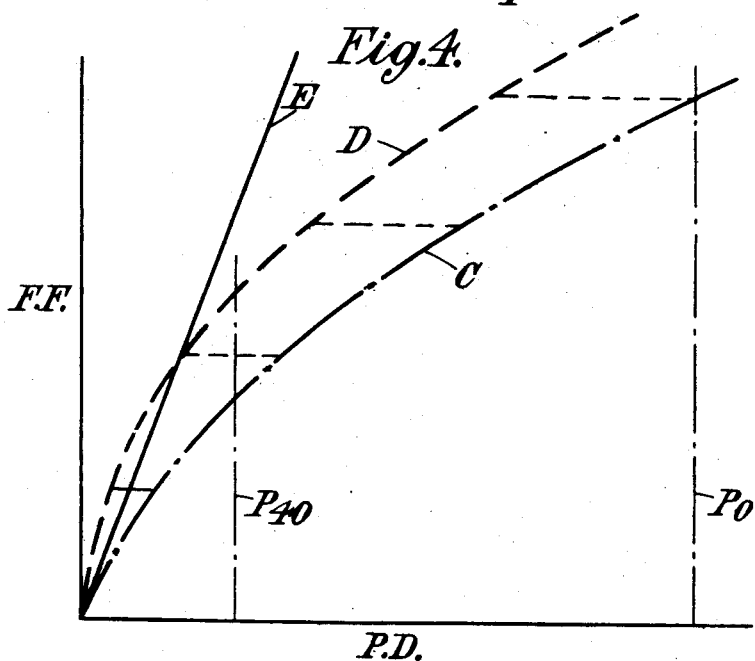

One embodiment of the invention will now be described as applied in a known fuel system for a gas-turbine engine. The description makes reference to the accompanying drawings in which:

Figure 1 illustrates diagrammatically a gas-turbine engine and the fuel system therefor, Figure 2 illustrates the fuel system in more detail, and Figures 3 and 4 are graphs illustrating the effect of the invention.

Referring to Figure 1, there is illustrated a simple gas-turbine engine suitable for propelling an aircraft by jet-propulsion and comprising a compressor 10 illustrated as of the axial-flow type, combustion equipment illustrated as comprising a plurality of combustion chambers 11 connected to the delivery of the compressor 10 to receive compressed air therefrom, a turbine 12 for driving the compressor connected to receive hot gases from the combustion chambers 11 and an exhaust unit 13. A jet-pipe having a propulsion nozzle (not shown) will be connected to the end of the exhaust assembly 13.

Fuel is burnt in the combustion chambers 11 to heat the air delivered thereto and the fuel is delivered into the combustion chambers by fuel injection devices 14 which are connected to a common manifold 15 from the engine fuel supply system.

The engine fuel supply system is illustrated in Figures 1 and 2 and comprises an engine-driven fuel pump 16 which is illustrated as being of the variable-delivery type and which draws in fuel from a fuel tank (not shown) through a suction pipe 17 and delivers the fuel under pressure through a pipe-line 18 which is connected to the manifold 15 leading to the fuel injection devices 14.

Located in the fuel delivery pipe 18 there is an orifice-type fuel-flow metering device 19 and a shut-off valve 20. The shut-off valve is fully open when the engine is running and fully closed when the engine is not running.

The fuel system also comprises a device 21, referred to hereinafter as a barometric flow control, which device is arranged to control the difference in the pressures in pipeline 18 just upstream and just downstream of the orifice-type fuel-flow metering device 19.

The fuel pump 16 which as stated is of the variable-delivery type, comprises a pump rotor 23 formed with a series of substantially axial bores, a plurality of plungers 24 in the bores in the pump rotor 23, a swashplate mechanism 26 co-operating with the outer ends of the plungers so that on rotation of the pump rotor 23 the plungers 24 are reciprocated in the bores in the pump rotor 23 by the swash-plate mechanism 26 against the action of springs 25.

The stroke of the pump plungers 24 and thus the fuel delivery of the pump 16 is controlled by the inclination of the swash-plate mechanism 26 to the axis of rotation of the pump rotor 23, and a servo-mechanism is provided to adjust the angle of inclination of the swash-plate mechanism to the pump rotor axis.

The servo mechanism comprises a piston 27 working in a cylinder divided into two chambers 28, 29 and a spring 30 is located in the chamber 29 to load the piston 27 in a manner tending to move it to increase the angle of inclination of the swash-plate mechanism 26 and thus to increase the stroke of the pump plungers 24 and the pump fuel delivery. The chamber 28 is connected by a duct 28a to the fuel delivery port 18a of the pump 16 so that the pressure within the chamber 28 is the fuel delivery pressure. The chamber 29 is also connected with the pump delivery port 18a through the duct 28a but there is additionally provided a restricted inlet 31 to the space 29.

Also connected to the chamber 29 there is a bleed pipe 44 and a bleed passage 32. It will be seen that if there is no bleed from the chamber 29 then the fluid pressures in the two chambers 28 and 29 are equal and the piston 27 will be urged to the left (as viewed in the drawings) to move the swash-plate mechanism to the maximum stroke position for the pump plungers 24.

The bleed passage 32 is associated with a top speed governor mechanism comprising a half-ball valve element 33 arranged to control the outflow of fluid from the chamber 29 through the passage 32, and the half-ball valve 33 is carried on a pivoted lever 36 which is loaded by a spring 37 in a direction tending to close the half-ball valve on to the outlet from the passage 32. The bleed from the passage 32 flows into a chamber 34 and thence through a duct 35 to the suction side of the fuel pump 16.

The chamber 34 is separated from a further chamber 42 by means of a flexible diaphragm 39 carrying a tappet element 38 which under certain operating conditions of the pump 16 engages with the lever 36 to rock it in a direction to lift the half-ball valve 33. The diaphragm has connected to it a tension spring 40 having an adjustable abutment 41 and the tension spring 40 tends to hold the tappet 38 out from engagement with the lever 36. The chamber 42 is pressurised by a centrifugal pump formed in the rotor 23, by a central axial bore 43 connected at one end with the suction side of the pump 16 and connected at the other end with a series of substantially radial bores 43a which open into the chamber 42.

As the engine speed increases and thus the speed of rotation of the pump rotor 23 increases the pressure within the chamber 42 increases, and it is arranged that when the engine rotational speed reaches its maximum permissible value the fluid pressure load on the diaphragm 39 is sufficient to overcome the spring 40 and to allow the tappet 38 to engage the lever 36 to bleed off servo fluid from the chamber 29, thus causing a reduction of the pressure within the chamber 29 and a decrease in the pump stroke.

The outflow of servo fluid from the chamber 29 through the pipe 44 is controlled by the barometric flow control 21 so as to control the difference in the pressures in the fuel delivery pipe 18 just upstream and just downstream of the orifice-type fuel-flow metering device 19 to be substantially proportional to an atmospheric pressure which may be either the ambient atmospheric pressure or the ambient atmospheric pressure as modified by flight of an aircraft or ambient atmospheric pressure as modified by the conditions prevailing in the air-intake to the compressor 10 or as modified by both the speed of flight and the conditions prevailing in the air-intake to the compressor 10.

The barometric flow control 21 comprises a half-ball valve element 45 carried on a lever 46 supported by a flexible diaphragm 47 which separates the barometric pressure control into two chambers 48 and 49. The servo fluid flowing through the pipe 44 enters the chamber 48 under control of the half-ball valve 45 and thence passes through a return pipe 50 back to the suction pipe 17. The chamber 49 is connected through a conduit 52 to a suitable atmospheric pressure point on the aircraft or in the engine.

The lever 46 is arranged to be rocked under the control of three principal loads as follows:

(a) A load which varies in accordance with variations of the atmospheric air pressure. This load is applied to the lever through an expansible capsule 51 accommodated in the chamber 49, and it will be seen that as the atmospheric air pressure decreases the load afforded on the lever 46 by the capsule 51 increases, and that as the atmospheric air pressure increases the load afforded by the capsule 51 decreases. The load applied by the capsule 51 is in a direction tending to rock the lever 46 to lift the half-ball valve 45.

(b) A load which is dependent on the difference in the fuel pressures in the fuel delivery pipe 18 just upstream of and just downstream of the orifice-type fuel-flow metering device 19. This load is applied to the lever 46 through a tappet 54 under control of a flexible diaphragm 53 separating a pair of chambers 61 and 62, whereof the chamber 61 is connected by a pipe 55 to the fuel delivery pipe 18 just upstream of the orifice-type fuel-flow metering device 19 and whereof the chamber 62 is connected by a pipe 56 to the fuel delivery pipe 18 just downstream of the device 19. The diaphragm 53 carries a stop 53a to limit its movements in a direction away from the lever 46. The load which is dependent on this pressure difference in the fuel delivery pipe 18 is applied to the lever 46 in the same direction as is the load due to the capsule 51.

(c) A spring load applied to the lever 46 in a direction to oppose the loads applied to the lever 46 by the capsule 51 and the diaphragm 53. The spring load is applied to the lever through a tappet 64 carrying at its outer end an abutment member 65 for a compression spring 57 accommodated in a chamber 58 separated from the chamber 48. The other abutment 66 for the spring 57 is adjustable by means of a set screw 59. The chamber 58 is connected by pipe 60 to pipe 56 so that the pressures in chambers 58 and 62 are equal; this arrangement compensates for the difference in the effective areas of the sides of diaphragm 53 due to the presence of tappet 54.

In operation of the barometric flow control the moments of the loads applied to the lever 46 by the capsule 51 and the diaphragm 53 are, under steady running conditions, balanced by the moment of the load applied by the spring 57. If the atmospheric air pressure remains constant then the barometric flow control operates to maintain the difference in pressure at a given value and if an unwanted increase in the difference in pressure occurs the half-ball valve is lifted so permitting a bleed from the chamber 29 and a reduction in fuel delivery, and if an unwanted decrease in the pressure difference occurs the half-ball valve 45 is closed more firmly so that the pump stroke increases and the fuel delivery into the fuel delivery pipe 18 also increases. On increase of the atmospheric air pressure the capsule 51 collapses decreasing the load applied by it to the lever 46 and thus increasing the load due to the fuel pressure difference necessary to balance the load due to spring 57. Thus when the atmospheric air pressure increases the fuel delivery will increase. Conversely, if the atmospheric air pressure decreases the load due to the capsule will increase and the fuel delivery by the pump 16 will be decreased to reduce the difference in pressures on each side of the device 19. The difference in fuel pressures is substantially directly proportional to the atmospheric air pressure.

The orifice-type fuel-flow metering device 19 comprises a throttle valve comprising an orifice 70, the effective area of which is determined by a valve member 71 co-operating with the orifice 70, and the position of the valve member 71 in the orifice 70 is adjustable by means of a manual control lever 73 through any suitable mechanism 72 which is illustrated as a rack and pinion.

It has been found that if the device 19 comprises only the variable-area orifice 70, the pressure drop across which is substantially proportional to the square of the fuel flow therethrough for any given setting of the valve member 71, then for certain settings of the fuel flow orifice, say for a high-power setting of the manual control lever 73, the quantity of fuel delivered to the engine is excessive at high altitudes so that the engine tends to overspeed.

To overcome this difficulty there is provided in this embodiment of the invention a further orifice means which is hydraulically in series with the orifice 70, so that fuel flowing through the orifice 70 also flows through the further orifice means. The further orifice means comprises an orifice 74 the effective area of which is arranged to be varied by means of a valve member 75 which is loaded by a spring 76 in a direction tending to reduce the effective area of the orifice 74. The portion 75a of the valve member 75, that is the portion of the valve member which co-operates with the orifice 74, is so shaped, for example is made conical, and the rate of the spring 76 is so selected that the pressure drop across the orifice 74 is substantially proportional to the flow through the orifice. In other words, the further orifice means has a flow characteristic in which the relationship between the flow through the orifice means and the pressure drop across it is a linear one.

The pressure difference which is controlled by the barometric pressure control 21 to be substantially proportional to the atmospheric air pressure is therefore the sum of the pressure drops across the orifices 74 and 70.

The effect on the fuel delivery to the engine of providing an orifice-type fuel-flow metering device 19 in accordance with the invention will now be described with reference to the graphs shown in Figures 3 and 4.

Referring to Figure 3 in which fuel flows FF are plotted as ordinates and pressure drops PD which are proportional to an atmospheric air pressure $P_1$ are plotted as abscissae, the curve A illustrates the actual fuel requirements to maintain a constant maximum rotational speed of a simple jet engine such as is illustrated in Figure 1 for different values of atmospheric air pressure $P_1$, and the lines $P_0$ and $P_{40}$ indicate the value to which the pressure difference in the fuel system across the device 19 will be controlled at ground level and at 40,000 ft. respectively.

It will be noted that as indicated the curve A theoretically passes through the origin O.

Curve B illustrates the fuel flows which will be obtained with a known form of the device 19 which comprises merely the adjustable area orifice 70, for a given setting of the valve member 71 such that the area of the orifice 70 gives a fuel flow equal to the engine requirements at atmospheric pressure $P_0$. Since the fuel flows are substantially proportional to PD, for the given setting of valve member 71 the curve B departs from the curve A which is relatively flat over the operational range, that is the range of values of PD between $P_0$ and $P_{40}$. From a consideration of the curves A and B it will be seen that with an increase in altitude and thus with a decrease in the atmospheric air pressure, the fuel delivered to the engine with the known arrangement considerably exceeds the engine requirements for the given rotational speed, so that the speed of the engine with the known arrangement increases with altitude at a constant setting of the manual control lever 73. This increase of speed is known as "positive barometric creep" and is undesirable particularly for high-power settings of the power control lever 73.

Referring now to Figure 4, graphs are illustrated showing the relation between fuel flows through orifice devices such as the orifice 70 and the orifice 74 and the pressure drops created across them. In Figure 4 the curve D illustrates the pressure drops obtained across the variable area orifice 70 with various fuel flows, at a selected setting of the valve member 71, and the straight line E illustrates the pressure drops obtained with various fuel flows across a linear flow valve formed by the orifice 74 and valve member 75. The curve C illustrates the sum of these pressure drops, which sum represents the total pressure drops obtained with various fuel flows with an adjustable area orifice such as the orifice 70 hydraulically in series with a linear flow valve such as the linear flow valve 74, 75. The curve C therefore illustrates the relation between the fuel flow through the orifice-type fuel-flow metering device 19 as illustrated in Figure 2 of the accompanying drawings to the pressure drop across the device. It will be seen that the curve C is a flattish curve similar to the curve A. The curve C is also shown in Figure 3, from which it will be seen that by suitable selection of the characteristics of the two orifices in the device 19 in accordance with the invention, fuel flows will be obtained when the pressure drop across the device 19 is controlled by the barometric flow control 21, such as to maintain a substantially constant rotational engine speed for a given setting of the control lever 73 irrespective of changes of the atmospheric air pressure.

Similar curves will be obtained for each setting of the adjustable area orifice 70.

The device 19 may also include a second linear flow valve arrangement 77, such as described and claimed in concurrent patent application Serial No. 159,162, filed May 1, 1950, in the name of David O. Davies. This second linear flow valve is arranged hydraulically in parallel with the orifice 70 and it is arranged that for idling or low-power setting of the control lever 73 the orifice 70 is completely closed so that the whole of the fuel passes through the linear flow valve 77, or so that for an idling or low-power setting of the lever 73 part of the fuel passes through the orifice 70 and part through the parallel linear flow valve 77.

I claim:

1. A fuel system for a gas-turbine engine which fuel system comprises a pressure fuel source; an orifice-type fuel-flow-metering device connected to pass fuel from said pressure fuel source and comprising a first metering orifice, a valve member co-operating with said first metering orifice and arranged to be adjustable to select the effective area of said first metering orifice, whereby for each selected effective area a pressure drop is caused which is substantially proportional to the square of the fuel flow through said first metering orifice, a second metering orifice connected hydraulically in series with said first metering orifice, an area-determining valve member arranged to co-operate with said second metering orifice and to be displaceable by the flow through said second metering orifice to increase the effective area thereof on increase of said flow, and a spring to oppose displacement of said area-determining valve member to give a position of said area-determining valve member and thus an effective area of said second metering orifice to create a pressure drop which is directly proportional to the flow through the said metering orifice; and a pressure-responsive device arranged to be responsive to an atmospheric air pressure and arranged to maintain the sum of the pressure drops across said first and second metering orifices at a predetermined value which varies in a directly proportional manner to the atmospheric air pressure.

2. A fuel system for a gas-turbine engine which fuel system is of the class comprising a pressure fuel source, an orifice-type fuel-flow-metering device connected to pass fuel from said pressure fuel source, and a pressure-responsive device arranged to be responsive to an atmospheric air pressure and arranged to control the difference in fuel pressures on each side of said orifice-type fuel-flow-metering device to be a predetermined value which is substantially directly proportional to the atmospheric air pressure, and which fuel system is characterized by the orifice-type fuel-flow-metering device comprising a first metering orifice, a valve member co-operating with said first metering orifice and selectively adjustable to select the effective area of said first metering orifice, whereby for each selected effective area there is created a pressure drop which is substantially proportional to the square of the fuel flow through the metering device, a second metering orifice, an area-determining valve member co-operating with said second orifice and displaceable by the flow therethrough to increase the effective area of said second orifice on increase of said flow, and a spring to oppose displacement of said area-determining valve member and to maintain said area-determining valve member in a position relative to said second orifice to create a pressure drop across said second orifice which is substantially proportional to said flow, said first and second metering orifices being connected in series with one another whereby the controlled difference in fuel pressures is the sum of said pressure drops.

3. A fuel supply system for a gas-turbine engine in which a difference of two fuel pressures is controlled to be a predetermined value which varies in a substantially directly proportional manner to an atmospheric air pressure, comprising a pump an orifice-type fuel-flow metering device comprising a duct connected to the delivery of said pump, a first member in said duct affording a first orifice, an adjustable valve member co-operating with said first orifice to determine its effective area, manual means to adjust the adjustable valve member to select the effective area of said first orifice, the pressure drop across said orifice for each selected effective area being therefore proportional to the square of the fuel flow therethrough, a second member in said duct affording a second orifice which is hydraulically in series with said first orifice, a floating valve member which member has a conical head to co-operate with said second orifice to vary its effective area, and a spring arranged to load said floating valve member in a manner tending to reduce the effective area of said second orifice, said conical head having such a conicity and said spring having such a rate that, on fuel flow through said second orifice, the floating valve member takes up a position with respect to the second orifice to cause a pressure drop substantially proportional to the fuel flow therethrough, said orifice-type fuel-flow metering device being arranged so that the sum of the pressure drops across the two orifices is the controlled pressure difference; and said orifices and valve members having such characteristics that, for a selected area of said first orifice, the fuel flow through said device as determined by each predetermined value of said controlled pressure difference is substantially equal to the engine fuel requirements at the corresponding atmospheric air pressure.

4. A fuel system for a gas-turbine engine of the kind including a variable-delivery liquid fuel pump having an output-varying member; an actuating member to actuate said output-varying member and arranged to be exposible at opposite sides to liquid pressure; a valve adapted to relieve the liquid pressure at one side of the actuating member; actuating means for said valve; an atmospheric-pressure-responsive device to load said actuating means in the sense of increasing the pump output on increase of atmospheric pressure; resilient means to load said actuating means in the sense of increasing said pump output; fuel-pressure-responsive means to load said actuating means; an orifice-type fuel-flow-metering device connected to pass the output flow from said pump, and comprising a first metering orifice, a valve member co-operating with said first metering orifice and selectively adjustable to select the effective area of said first metering orifice, whereby for each selected effective area there is created a pressure drop which is substantially proportional to the square of the fuel flow through the metering orifice, a second metering orifice, an area-determining valve member co-operating with said second orifice and displaceable by the flow therethrough to increase the effective area of said second orifice on increase of said flow, and a spring to oppose displacement of said area-determining valve member and to maintain said area-determining valve member in a position relative to said second orifice to create a pressure drop across said second orifice which is substantially proportional to said flow, said first and second metering orifices being connected in series with one another; a first pressure connection from upstream of said orifice-type fuel-flow-metering device to load said fuel-pressure-responsive means and said actuating means in the sense of decreasing said pump output on increase of said upstream pressure; and a second pressure connection from downstream of said fuel-flow-metering device to said fuel-pressure-responsive means to load it in opposition to the load applied through said first pressure connection.

5. A fuel system for a gas-turbine engine comprising a variable-delivery fuel pump; means to vary the delivery of said pump; an orifice-type fuel-flow-metering device connected to pass the delivery flow from said pump and comprising a first metering orifice, a valve member co-operating with said first metering orifice and selectively adjustable to select the effective area of said first metering orifice, whereby for each selected effective area there is created a pressure drop which is substantially proportional to the square of the fuel flow through the metering device, a second metering orifice, an area-determining valve member co-operating with said second orifice and displaceable by the flow therethrough to increase the effective area of said second orifice on increase of said flow, and a spring to oppose displacement of said area-determining valve member and to maintain said area-determining valve member in a position relative to said second orifice to create a pressure drop across said second orifice which is substantially proportional to said flow, said first and second metering orifices being connected in series with one another, whereby the difference in the fuel pressures on each side of said orifice-type fuel-flow-metering device is equal to the sum of the pressure drops across said first and second metering orifices; and pressure-responsive means responsive to an atmospheric air pressure and to the difference in fuel pressures across the orifice-type fuel-flow-metering device and operative to control said delivery-varying means to vary the delivery from said pump to maintain the sum of the pressure drops substantially directly proportional to said atmospheric air pressure.

6. A fuel system for a gas-turbine engine comprising a source of fuel pressure; an orifice-type fuel-flow-metering device connected to pass the flow from said pressure fuel source and comprising a first metering orifice, a valve member co-operating with said first metering orifice and selectively adjustable to select the effective area of said first metering orifice, whereby for each selected effective area there is created a pressure drop which is substantially proportional to the square of the fuel flow through the metering device, a second metering orifice, an area-determining valve member co-operating with said second orifice and displaceable by the flow therethrough to increase the effective area of said second orifice on increase of said flow, and a spring to oppose displacement of said area-determining valve member and to maintain said area-determining valve member in a position relative to said second orifice to create a pressure drop across said second orifice which is substantially proportional to said flow, said first and second metering orifices being connected in series with one another, whereby the difference in fuel pressures on each side of the metering device is equal to the sum of the pressure drops across said first and second metering orifices; means to adjust the fuel pressure upstream of said metering device; and pressure-responsive means responsive to an atmospheric air pressure and to the pressure drop across the orifice-type fuel-flow-metering device and operative to control said pressure-adjusting means to maintain the pressure drop across the device substantially directly proportional to said atmospheric air pressure.

ALBERT JUBB.

No references cited.